United States Patent
Yao et al.

(10) Patent No.: US 7,551,405 B2
(45) Date of Patent: Jun. 23, 2009

(54) ROTATIONAL PZT MICRO-ACTUATOR WITH FINE HEAD POSITION ADJUSTMENT CAPACITY, HEAD GIMBAL ASSEMBLY, AND DISK DRIVE UNIT WITH SAME

(75) Inventors: MingGao Yao, DongGuan (CN); Masashi Shiraishi, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 435 days.

(21) Appl. No.: 11/385,698

(22) Filed: Mar. 22, 2006

(65) Prior Publication Data
US 2007/0223146 A1    Sep. 27, 2007

(51) Int. Cl.
*G11B 5/54* (2006.01)
(52) U.S. Cl. .................................... 360/294.4
(58) Field of Classification Search .............. 360/294.4
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,950,266 B1 | 9/2005 | McCaslin et al. | |
| 7,106,557 B2 * | 9/2006 | Kuwajima et al. | 360/294.4 |
| 7,184,245 B2 * | 2/2007 | Kasajima et al. | 360/294.4 |
| 7,218,482 B2 * | 5/2007 | Yao et al. | 360/294.4 |
| 2001/0046107 A1 * | 11/2001 | Irie et al. | 360/294.4 |
| 2002/0141117 A1 * | 10/2002 | Kasajima et al. | 360/294.4 |
| 2003/0147177 A1 | 8/2003 | Yao et al. | |
| 2003/0147181 A1 | 8/2003 | Shiraishi et al. | |
| 2003/0168935 A1 | 9/2003 | Ogawa et al. | |
| 2006/0023338 A1 | 2/2006 | Sharma et al. | |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—Jefferson Evans
(74) *Attorney, Agent, or Firm*—Nixon & Vanderhye P.C.

(57) ABSTRACT

A Head Gimbal Assembly (HGA) of the invention includes a slider; a micro-actuator to adjust the position of the slider; and a suspension to support the slider and the micro-actuator. The micro-actuator includes two side arms; a load plate for supporting the slider, which is connected with at least one of the side arms; a pair of piezoelectric (PZT) elements connected with the side arms; and a support shaft coupled with the suspension, the support shaft being connected with the side arms and positioned between the PZT elements. The invention also discloses a disk drive unit using such a HGA.

27 Claims, 14 Drawing Sheets

U.S. PATENT DOCUMENTS

| | | |
|---|---|---|
| 2006/0050442 A1 | 3/2006 | Yao et al. |
| 2006/0072247 A1 | 4/2006 | Yao et al. |
| 2006/0082917 A1 | 4/2006 | Yao et al. |
| 2006/0098347 A1 | 5/2006 | Yao et al. |
| 2006/0146449 A1 | 7/2006 | Yao et al. |
| 2007/0170817 A1* | 7/2007 | Ikeda et al. ............ 310/323.04 |

FOREIGN PATENT DOCUMENTS

| | | |
|---|---|---|
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/319,577, filed Dec. 2005, Yao et al.
U.S. Appl. No. 11/353,018, filed Feb. 2005, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

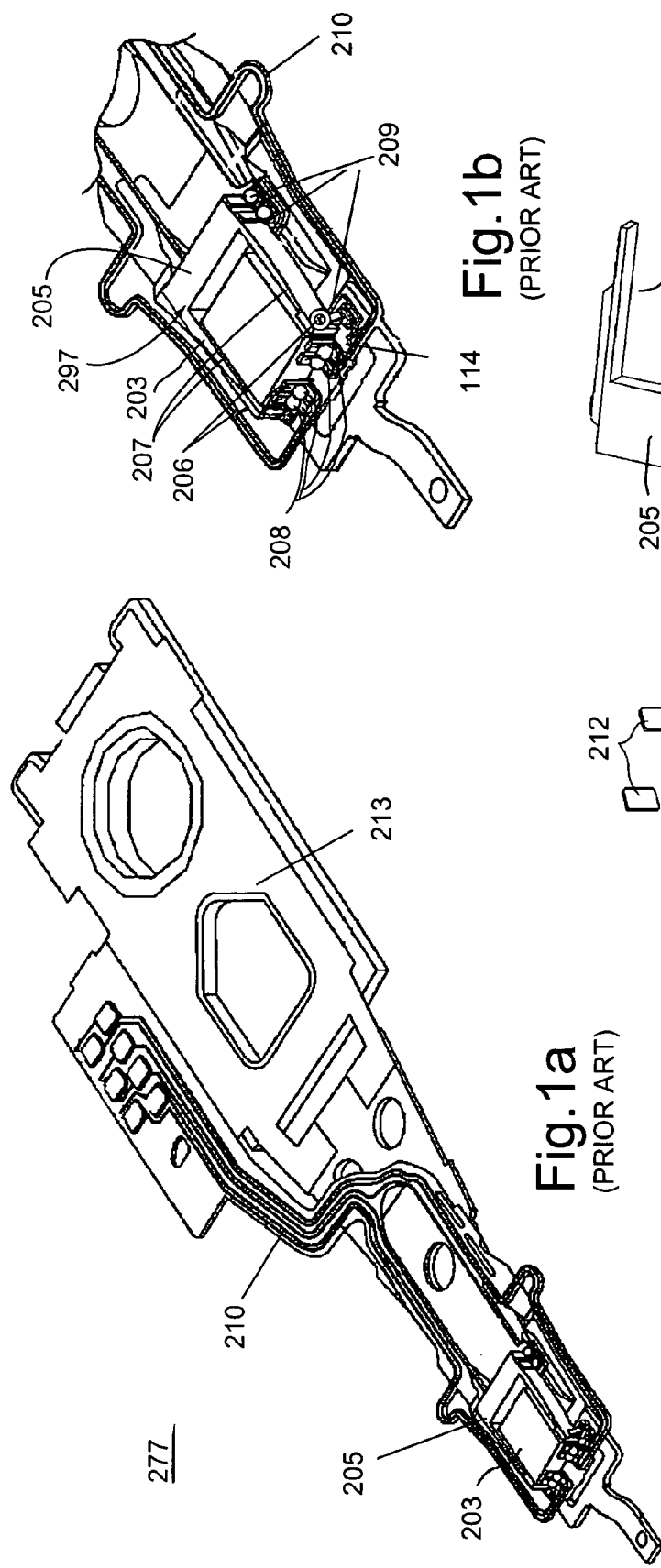
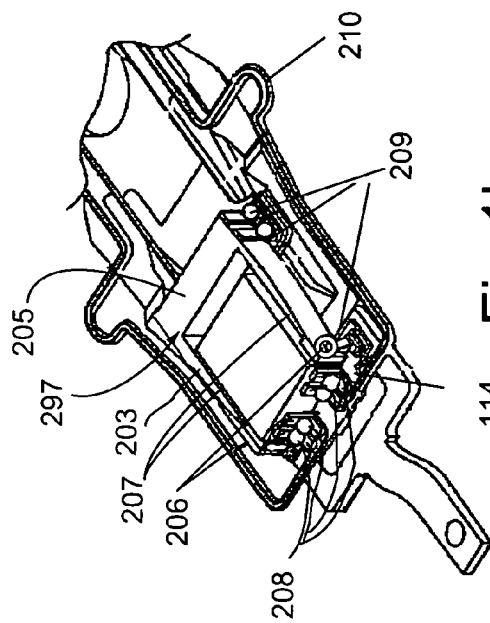
Fig.1b (PRIOR ART)
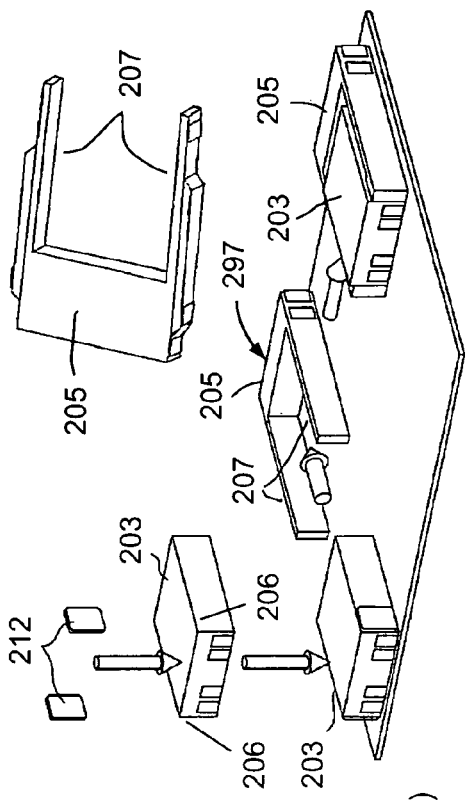
Fig.1c (PRIOR ART)
Fig.1a (PRIOR ART)

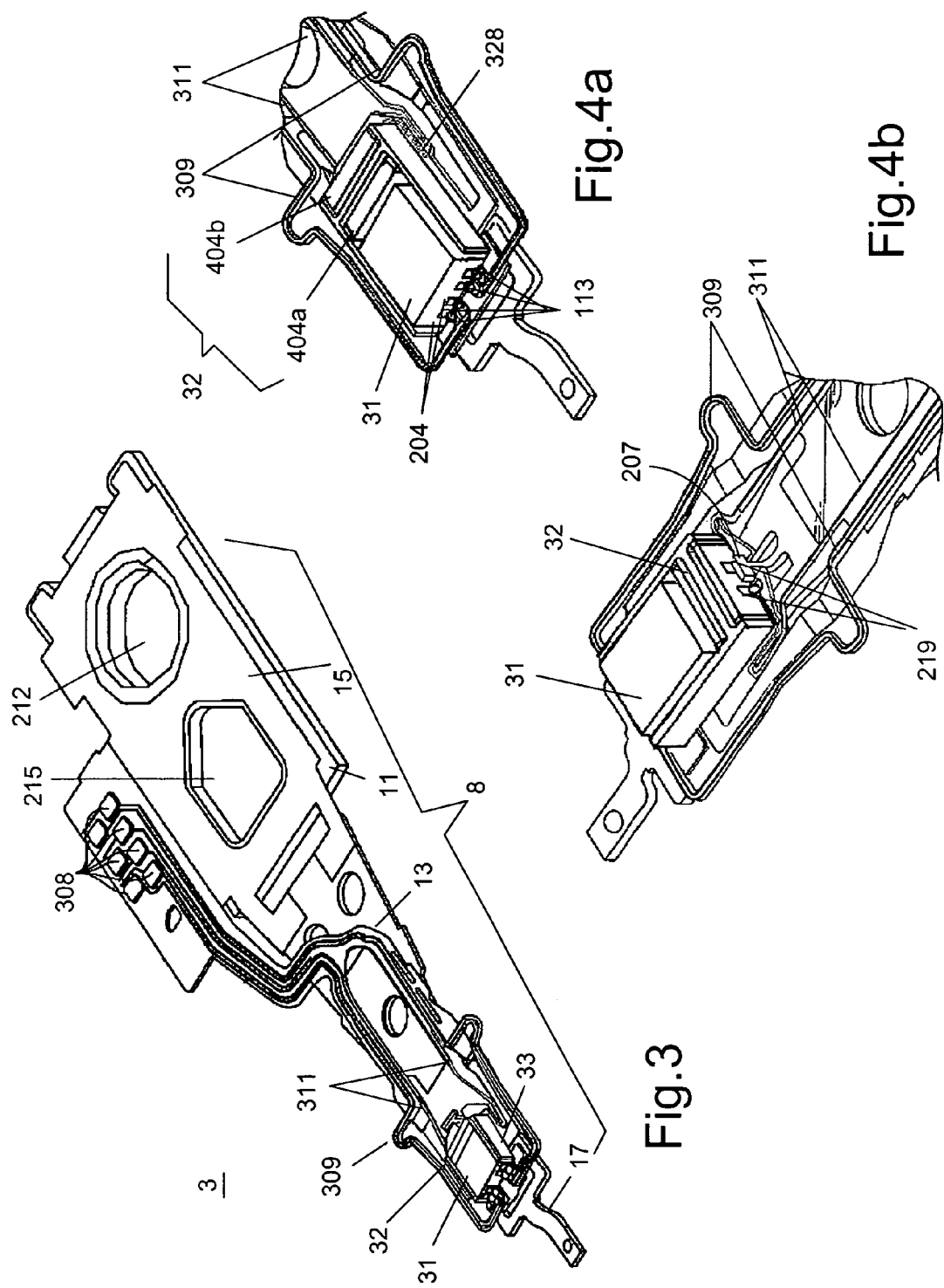

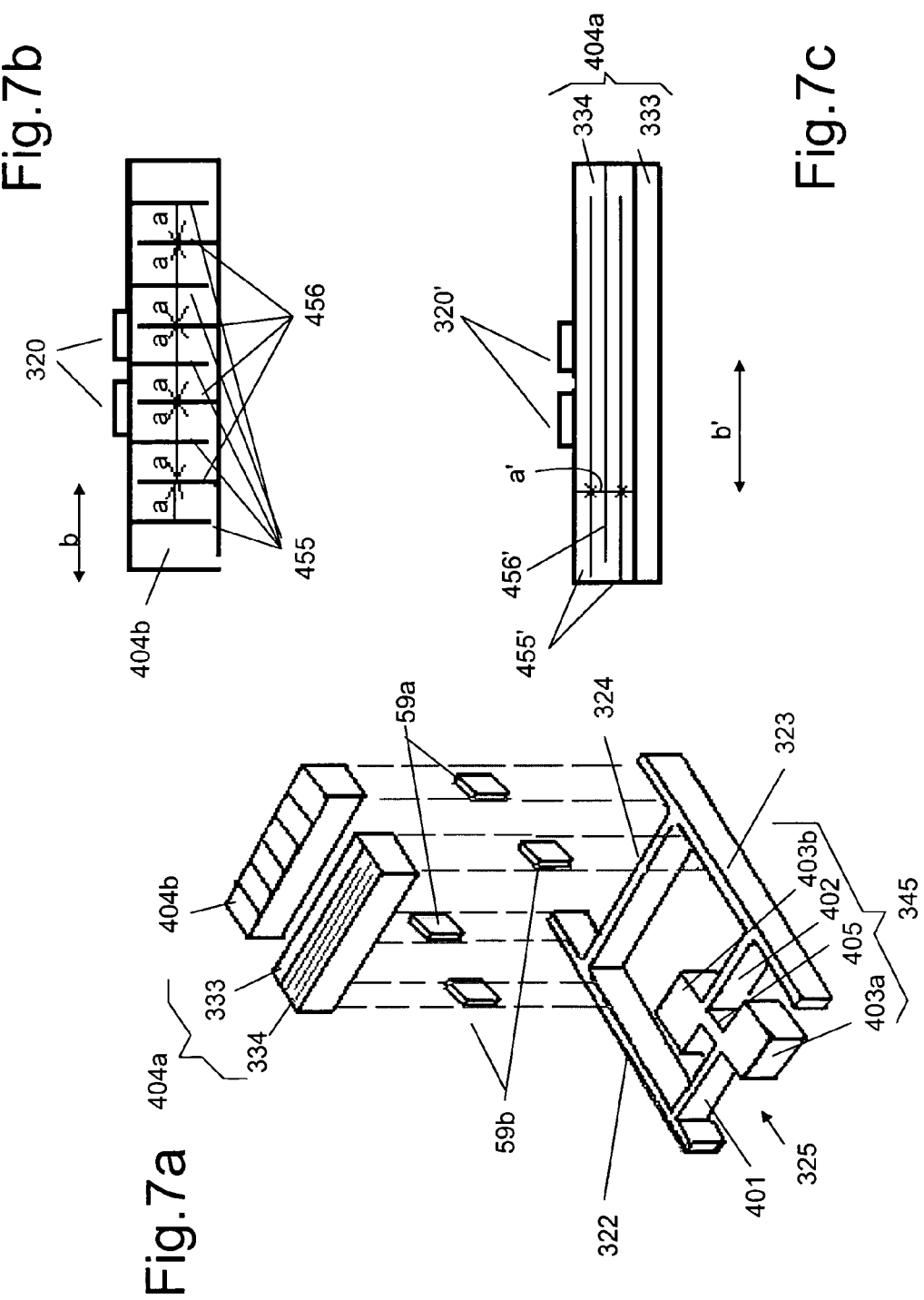

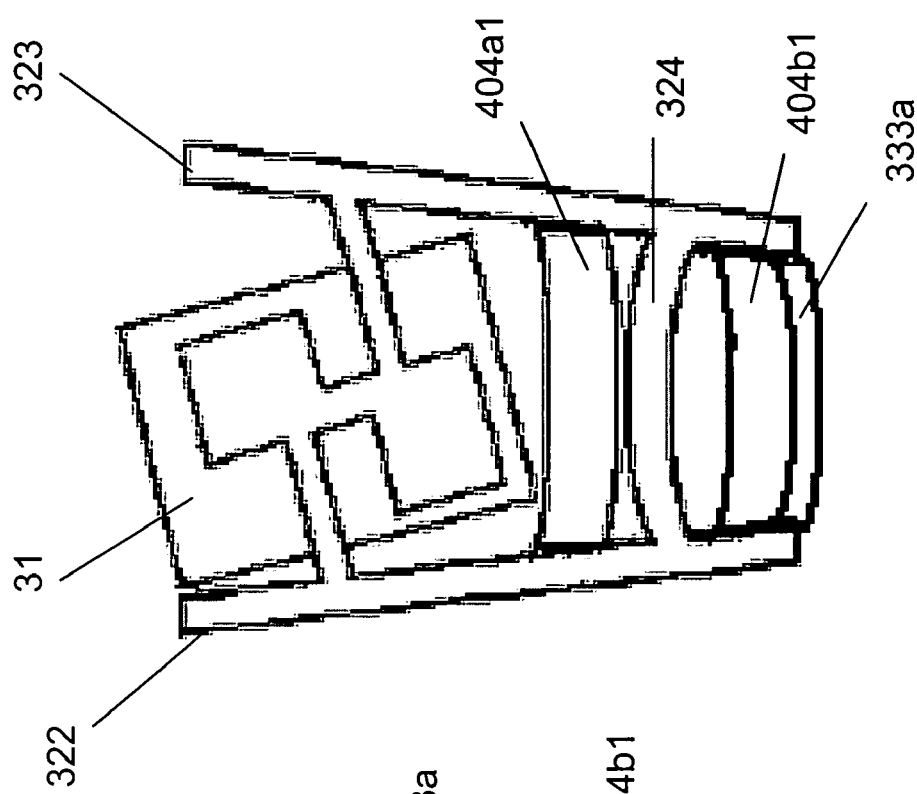
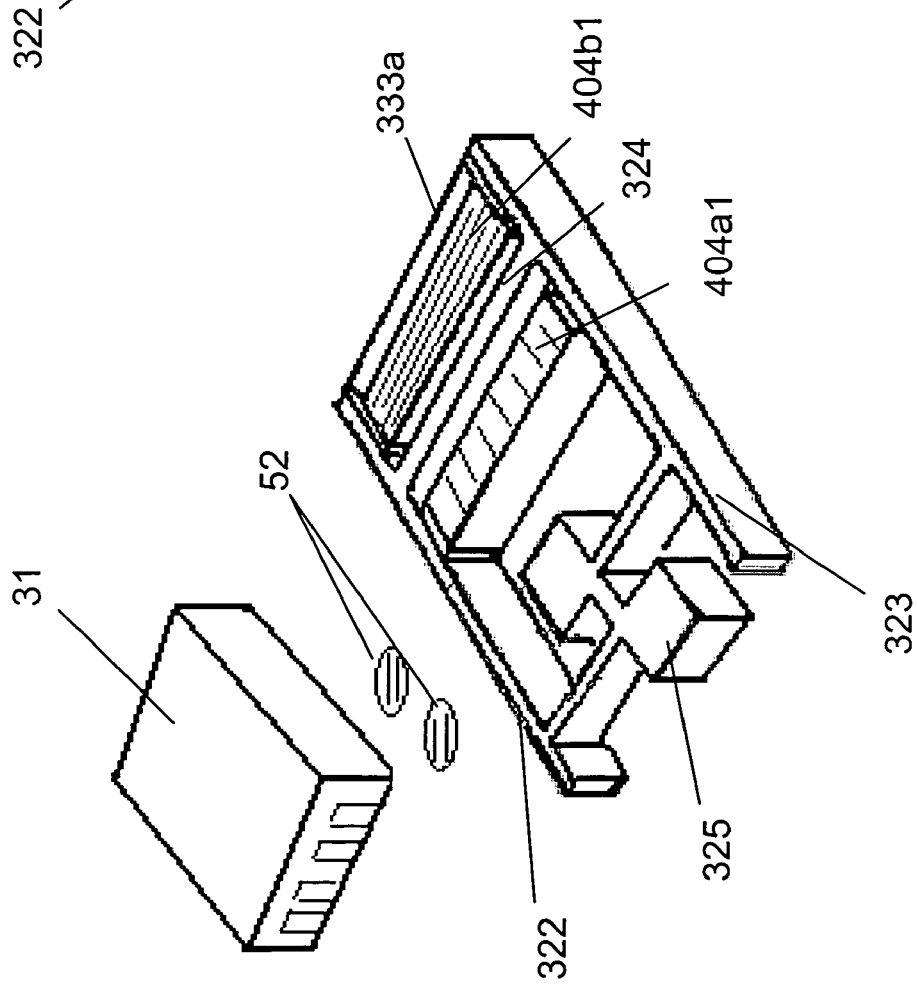
Fig. 10b
Fig. 10a

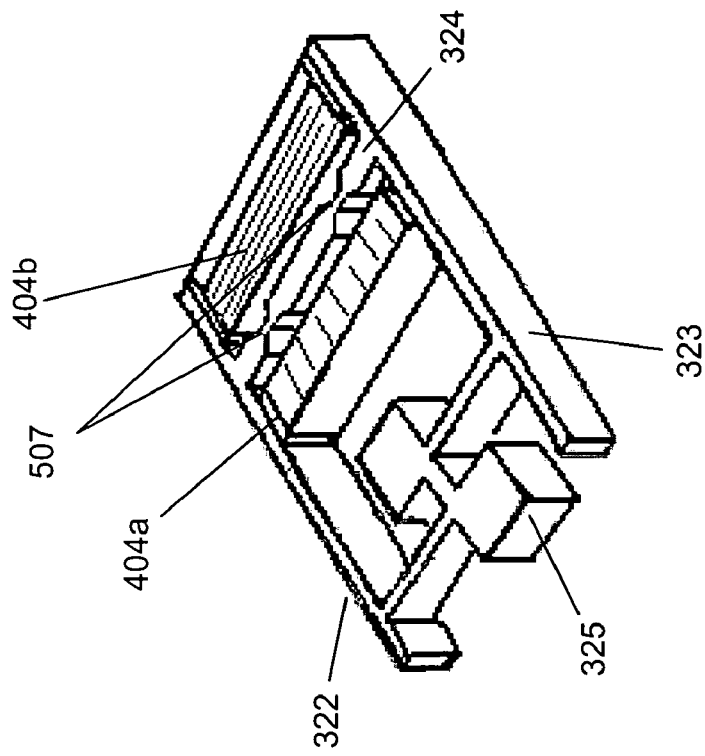
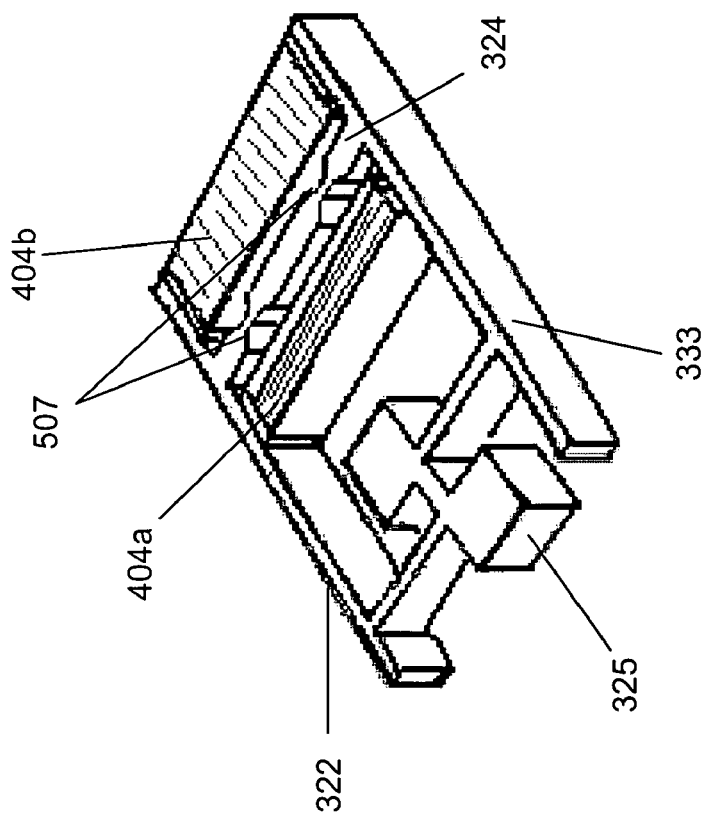
Fig.11a
Fig.11b

ROTATIONAL PZT MICRO-ACTUATOR WITH FINE HEAD POSITION ADJUSTMENT CAPACITY, HEAD GIMBAL ASSEMBLY, AND DISK DRIVE UNIT WITH SAME

FIELD OF THE INVENTION

The present invention relates to disk drive units, and particularly relates to a rotation-type micro-actuator and a head gimbal assembly with such micro-actuator.

BACKGROUND OF THE INVENTION

Disk drives are information storage devices that use magnetic media to store data. Referring to FIG. 1a, a typical disk drive in related art has a magnetic disk and a drive arm to drive a head gimbal assembly 277 (HGA). The HGA 277 has a suspension (213) with a slider 203 mounted thereon. The disk is mounted on a spindle motor which causes the disk to spin. The drive arm is provided with a voice-coil motor (VCM) for controlling the slider 203 to move from track to track across the surface of the disk to read data from or write data to the disk.

However, because of its large inertia the VCM has limited bandwidth. Thus the slider 203 can not attain a quick and fine position control which will affect the ability of the slider 203 to read data from and write data to the magnetic disk.

To solve the above-mentioned problem, piezoelectric (PZT) micro-actuators are now utilized to modify the displacement of the slider 203. That is, the PZT micro-actuator corrects the displacement of the slider 203 on a much smaller scale, and with higher frequency components than the VCM. It enables a smaller recording track width, hence increasing the 'tracks per inch' (TPI) value by 50%. It also reduces the head seeking and settling time. Both the disk surface recording density and drive performance are improved.

Referring to FIG. 1b, a traditional PZT micro-actuator 205 comprises a ceramic U-shaped frame 297 which comprises two ceramic beams 207 each of which having a PZT piece (not labeled) for actuation. With reference to FIGS. 1a and 1b, the PZT micro-actuator 205 is physically coupled to a suspension 213, and there are multiple (e.g., three) electrical connection balls 209 (gold ball bonding or solder ball bonding, GBB or SBB) to couple the micro-actuator 205 to the suspension traces 210 in each one side of the ceramic beam 207. In addition, there are multiple (e.g., four) metal balls 208 (GBB or SBB) to couple the slider 203 to the suspension traces 210 for electrical connection of the read/write transducers. FIG. 1c shows a detailed process of inserting the slider 203 into the micro-actuator 205. The slider 203 is bonded with the two ceramic beams 207 at two points 206 at the opening of the U-shaped frame by epoxy dots 212. The slider 203 and the frame 297 mutually form a rectangular hollow structure. The bottom of the U-shape frame 297 is attached to a suspension tongue (not shown in FIG. 1c) on the suspension. The slider 203 and the beams 207 are not directly connected to the suspension and thus move freely with respect to the suspension.

When an actuating power is applied through the suspension traces 210, the PZT pieces on the ceramic beams 207 will expand or contract, causing the two ceramic beams 207 to bend in a common lateral direction. The bending causes a shear deformation of the frame 297. Its rectangular shape becomes approximately a parallelogram. The slider 203 undergoes a lateral translation, because it is attached to the moving side of the parallelogram. Thus a fine head position adjustment can be attained.

However, translation of the slider 203 generates a lateral intertia force which causes a suspension vibration resonance which has the same resonance effect as shaking the suspension base plate. This will affect the dynamic performance of the HGA and limit the servo bandwidth and the capacity improvement of HDD. As shown in FIG. 2b, numeral 201 represents a resonance curve when shaking the suspension base plate and numeral 202 represents a resonance curve when exciting the micro-actuator 205 shown in FIGS. 1c and 2a. Under a frequency of 20K, there are several large peaks and valleys in the suspension frequency response, which indicate a bad characteristic of resonance. The figure clearly shows the above-mentioned problem.

Referring to FIG. 2a, the U shape micro-actuator 205 is partially mounted on the suspension tongue. When the micro-actuator 205 is operated, the two side arms 207a, 207b will bend outwardly. When one side arm 207a bends along the direction 200a, it will generate a reaction force Fa in the bottom arm which is mounted on the suspension tongue. This reaction force Fa will transfer to the suspension and generate a vibration which have the same effect as shaking the suspension base plate. Similarly, when the other side arm 207b bends along the direction 200b, it will generate a reaction force Fb in the bottom arm and this reaction force Fb will also transfer to the suspension and generate a vibration which have the same effect as shaking the suspension base plate.

Hence, it is desired to provide a micro-actuator, head gimbal assembly, disk drive to solve the above-mentioned problems.

BRIEF SUMMARY OF THE INVENTION

A main aspect of the present invention is to provide a HGA which can attain a good resonance performance and position adjusting performance.

Another aspect of the present invention is to provide a micro-actuator having a simple structure and a good position adjusting performance.

A further aspect of the present invention is to provide a disk drive unit with wide servo bandwidth and large stroke.

To achieve the above-mentioned features, according to an embodiment of the invention, a HGA comprises a slider; a micro-actuator to adjust the position of the slider; and a suspension to load the slider and the micro-actuator. The micro-actuator comprises two side arms; a load plate for supporting the slider, which is connected with at least one of the side arms; a pair of piezoelectric elements connected with the side arms; and a support shaft to couple with the suspension, which is connected with the side arms and positioned between the piezoelectric elements.

In an embodiment, the load plate comprises a support plate connected with the slider; two connecting plates connecting the support plate to the two side arms, respectively. The support plate comprises two support portions and a connecting portion to connect with the two support portions. The two connecting plates are respectively connected with symmetrical positions about a center of the support plate's gravity. The connecting plates have a more flexible portion than that of the support plate, the more flexible portion can be attained from a narrower width or a thinner thickness or shape. In an embodiment, the support shaft has at least one narrower portion adjacent to its ends.

According to an embodiment of the invention, the support shaft is integrally formed with the side arms. The slider is partially fixed by the load plate, for example, it is coupled with the two support portions of the load plate. In another embodiment, only the support shaft is partially fixed to the suspension by such as laser welding. One of the side arms is parallel to the other side arm. The load plate is connected with the symmetrical positions about a center of opposed surface of air bearing surface of the slider. Two gaps are respectively formed between the load plate and the suspension, and between the piezoelectric elements and the suspension. In addition, a plurality of electric pads are provided on the piezoelectric elements to electrically connect with the suspension.

A micro-actuator of the invention comprises two side arms; a load plate connected with at least one of the side arms; a pair of piezoelectric elements that move in opposite directions when subjected to a predetermined voltage and are connected with the side arms; and a support shaft to couple with the suspension, which is connected with the side arms and positioned between the piezoelectric elements. In the present invention, each piezoelectric element may be of any suitable construction such as a thin film piezoelectric element, a ceramic piezoelectric element or a PMN-Pt crystal. The piezoelectric element may comprise a PZT layer with a single-layer structure or a multi-layer structure. In a further embodiment, the PZT element may further comprise a substrate layer connected with the PZT layer.

A disk drive unit of the invention comprises a HGA; a drive arm to connect with the head gimbal assembly; a disk; and a spindle motor to spin the disk. The HGA comprises a slider; a micro-actuator to adjust the position of the slider; and a suspension to load the slider and the micro-actuator. The micro-actuator comprises two side arms; a load plate for supporting the slider, which is connected with at least one of the side arms; a pair of piezoelectric elements connected with the side arms; a support shaft to couple with the suspension, which is connected with the side arms and positioned between the piezoelectric elements.

Compared with the prior art, the micro-actuator of the present invention uses two simple PZT elements that move in opposite directions when subjected to a predetermined voltage to adjust the position of the slider so that the manufacturing cost is low and the manufacturing process is simplified. In addition, the two side arms of the invention rotate in opposite directions. Thus, the slider undergoes a pure rotation. By keeping the slider's center of gravity stationary, less power is required for micro-actuation because the read/write transducer is located at the distal end of the slider. Thus, a larger head position adjustment capacity can be attained without increasing the power of micro-actuation. Furthermore, the micro-actuator of the present invention imparts only a small moment, and no inertia force on the suspension. The suspension resonance due to the micro-actuation is reduced. Desirably, the servo bandwidth is improved and the HDD storage capacity is increased.

For the purpose of making the invention easier to understand, several particular embodiments thereof will now be described with reference to the appended drawings in which:

BRIEF DESCRIPTION OF THE DRAWINGS

FIG. 1a is a perspective view of a prior art HGA;

FIG. 1b is an enlarged, partial view of FIG. 1a;

FIG. 1c is an exploded view of a detailed process of inserting a slider into a micro-actuator of the HGA in FIG. 1a;

FIG. 2a is a perspective view of an assembled slider and micro-actuator of the HGA of FIG. 1a.

FIG. 2b shows a resonance curve of the HGA of FIGS. 1a and 2a.

FIG. 3 is a perspective view of a HGA according to a first embodiment of the present invention;

FIGS. 4a and 4b are enlarged, partial perspective views of the HGA of FIG. 3 according to different view angles;

FIG. 5 is an exploded view of FIG. 4a;

FIG. 7a is an exploded, perspective view of a micro-actuator of the HGA in FIG. 3;

FIG. 7b is an enlarged plan view of a first PZT element of the micro-actuator shown in FIG. 7a;

FIG. 7c is an enlarged plan view of a second PZT element of the micro-actuator shown in FIG. 7a;

FIG. 8b shows a waveform of voltage which is applied to the PZT elements of the micro-actuator of FIG. 7a;

FIG. 10a is an exploded, perspective view of a micro-actuator according to a second embodiment of the invention;

FIG. 10b is an enlarged plan view of the micro-actuator of FIG. 10a showing the micro-actuator after a positive voltage is applied to the first and second PZT elements;

FIG. 11a and FIG. 11b are perspective views of micro-actuators according to two further embodiments of the invention.

DETAILED DESCRIPTION OF THE INVENTION

Referring to FIG. 3, a head gimbal assembly (HGA) 3 of the present invention comprises a slider 31, a micro-actuator 32 and a suspension 8 to load the slider 31 and the micro-actuator 32.

Figure 2A:
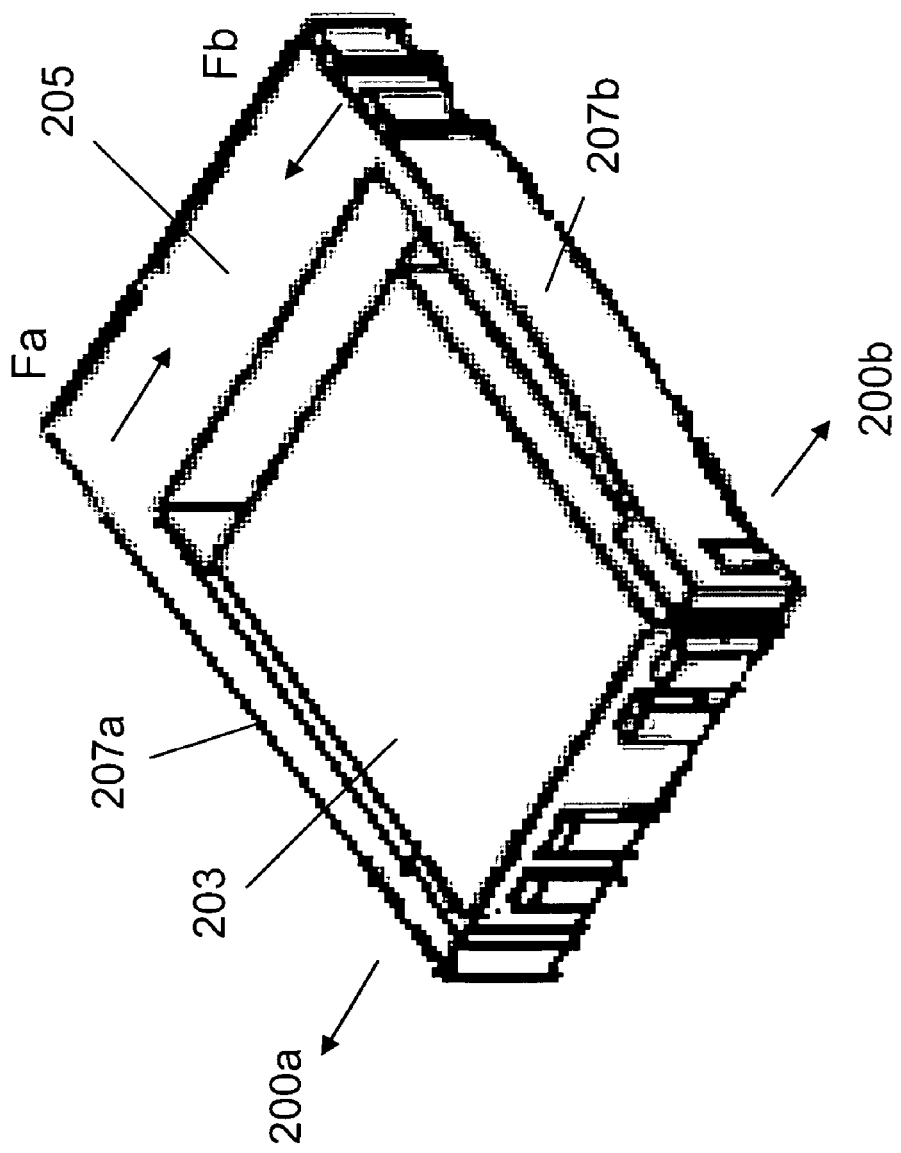
Figure 2B:
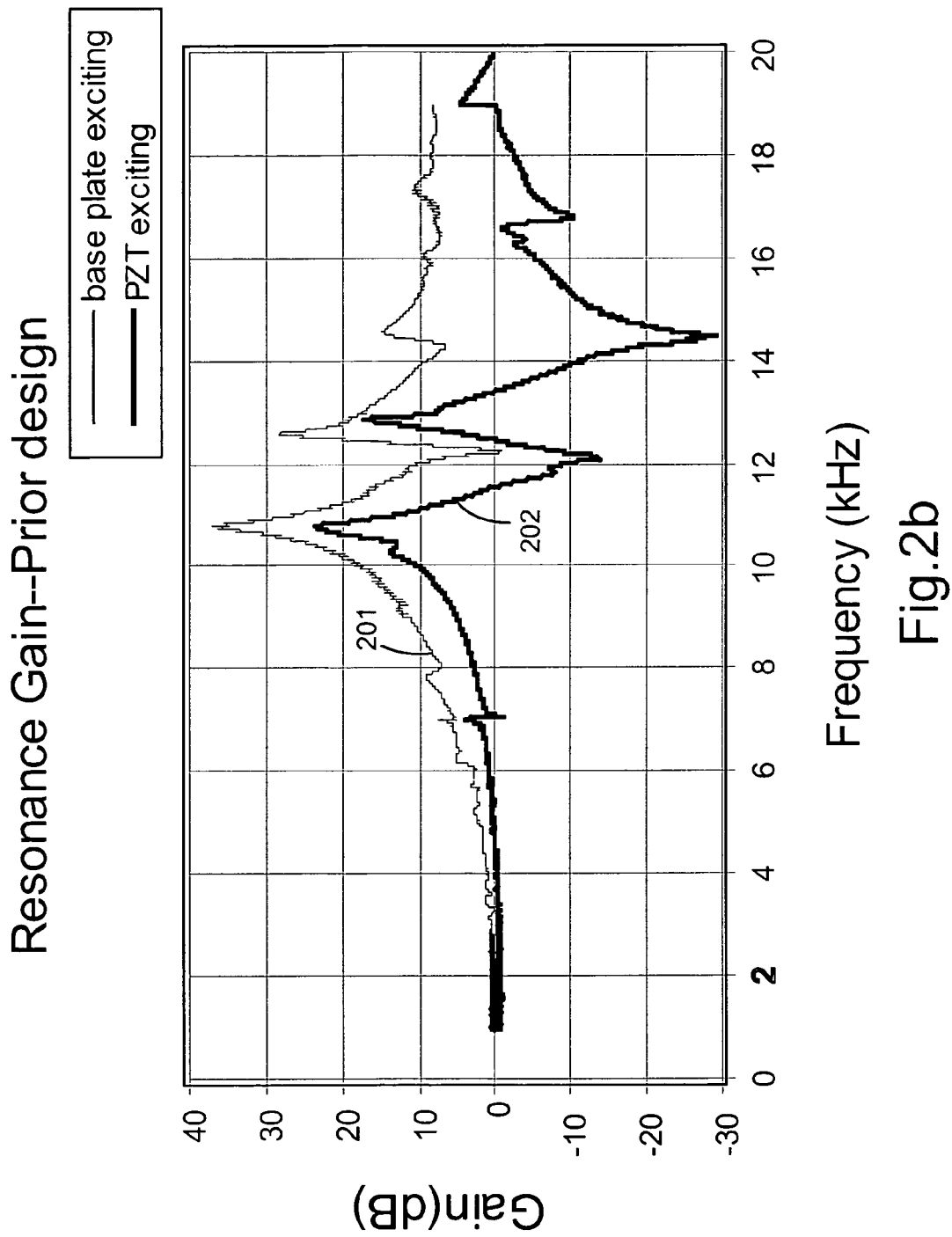
Figure 5:
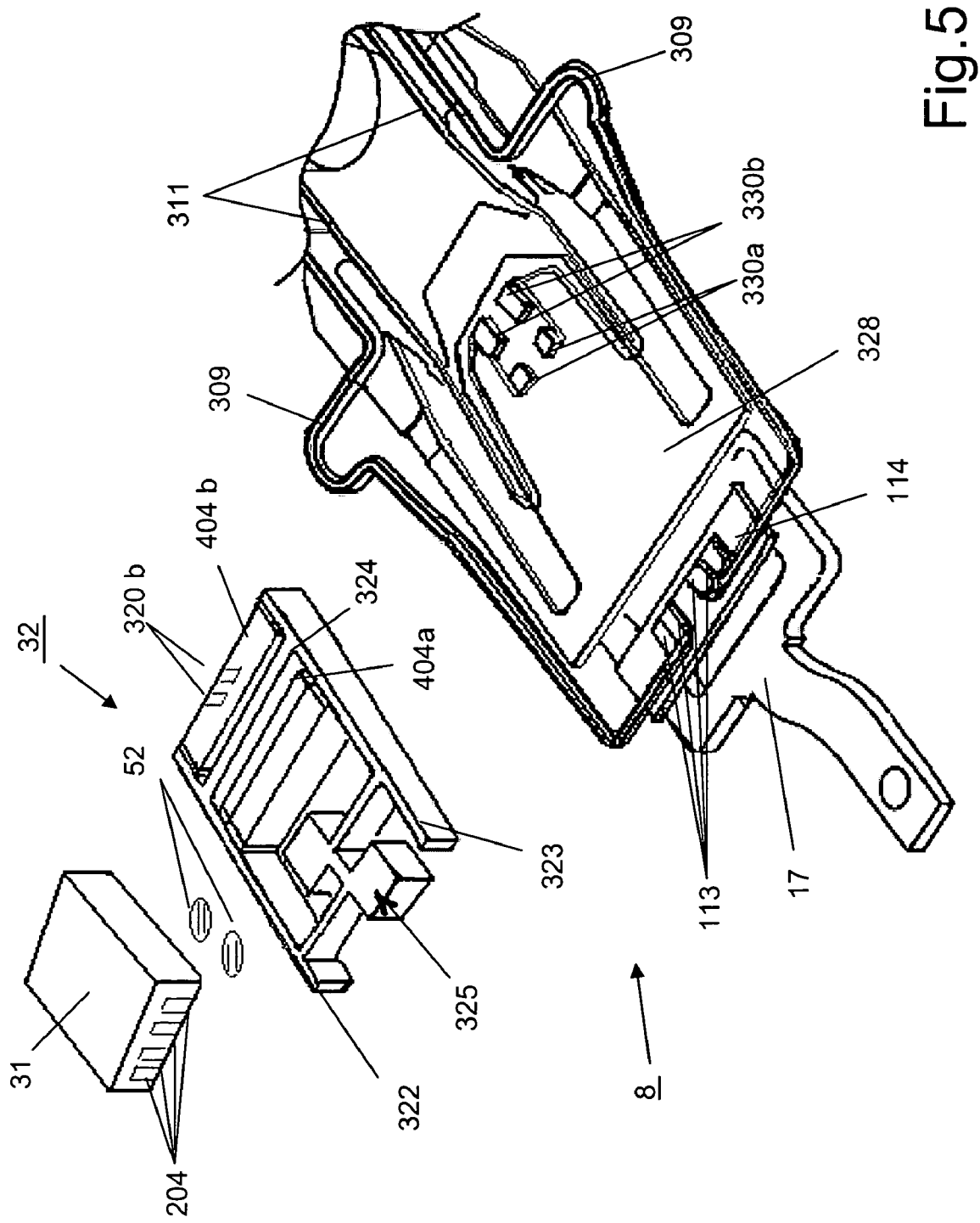
Figure 6:
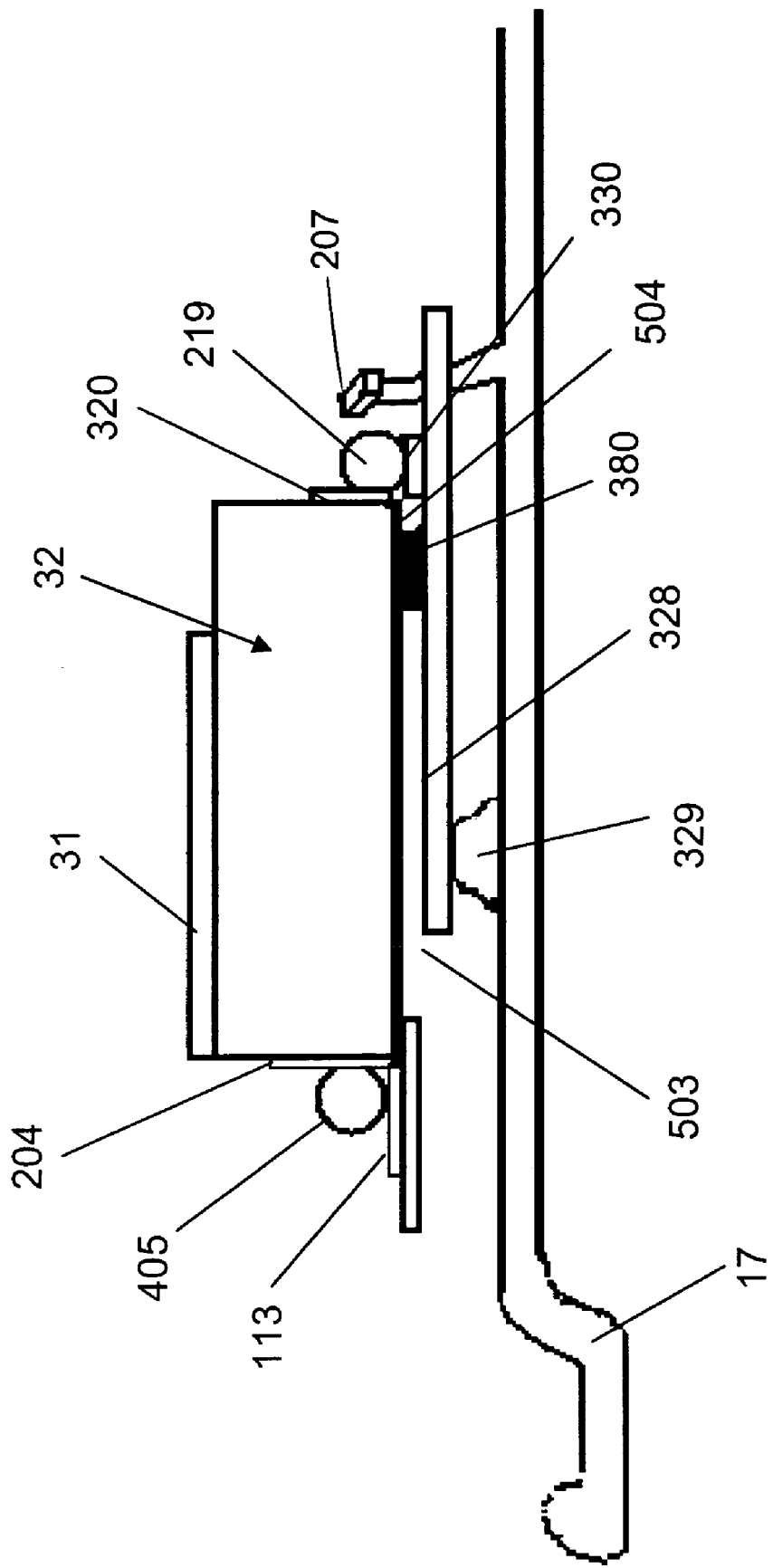
FIG. 6 is a partial, side view of the HGA of FIG. 3 in the micro-actuator area.

Also referring to FIG. 3, the suspension 8 comprises a load beam 17, a flexure 13, a hinge 15 and a base plate 11. On the flexure 13 a plurality of connection pads 308 are provided to connect with a control system (not shown) at one end and a plurality of electrical multi-traces 309, 311 are provided in the other end. Referring to FIGS. 4a, 4b and 5, the flexure 13 also comprises a suspension tongue 328 which is used to support the micro-actuator 32 and the slider 31. Referring to FIG. 6, the load beam 17 has a dimple 329 formed thereon to support the suspension tongue 328.

Referring to FIGS. 4b and 5, a limiter 207 is formed on the load beam 17 which extends through the suspension tongue 328 for preventing the suspension tongue 328 from being bent overly during normal operation of the disk drive or any shock or vibration applied to the disk drive. Thus the HGA 3 can attain a good shock performance. In the invention, the suspension tongue 328 has a plurality of electrical bonding pads 113, and 330a, 330b formed thereon. The electrical bonding pads 113 are connected with the multi-traces 309 while the electrical bonding pads 330a, 330b are connected with the multi-traces 311. The slider 31 also has a plurality of electrical bonding pads 204 on an end thereof corresponding to the electrical bonding pads 113 of a moving part 114 of the suspension tongue 328.

In the present invention, referring to FIGS. 5 and 7, the micro-actuator 32 comprises two side arms 322, 323, a load plate 325 for supporting the slider 31, a pair of piezoelectric (PZT) elements 404a and 404b connected with the side arms 322, 323, and a support shaft 324. In a preferred embodiment, the support shaft 324 is made of flexible material. In the present invention, the load plate 325 is also connected with the side arms 322, 323, and the support shaft 324 is connected with the side arms 322, 323 and positioned between the PZT elements 404a and 404b. Referring to FIG. 6, the support shaft 324 is partially bonded to the suspension tongue 328 with its middle portion by traditional medium 380, such as epoxy, adhesive, etc., so that two gaps 503, 504 are formed between the micro-actuator 32 and the suspension tongue 328, which are positioned at two sides of the traditional medium 380. In the present invention, the existence of two gaps 503, 504 will make the slider 31 and the PZT elements 404a and 404b hang above the suspension tongue 328, thus preventing an additional vibration to the suspension 8 when exciting the micro-actuator 32.

According to a first embodiment of the invention, as shown in FIGS. 5 and 7, the load plate 325 comprises a support plate 345 connected with the slider 31; two connecting plates 401, 402 extending from the support plate 345 to connect with the two side arms 322, 323, respectively. In a preferred embodiment, the two connecting plates 401, 402 are connected with symmetrical positions about a center of the support plate's 345 gravity. Because of the special connecting method, the support plate 345 will be rotated when the connecting plates 401, 402 are subjected to a pressure or pull force. In order to easily rotate the support plate 345, in an embodiment, the connecting plates 401, 402 have a narrower width than that of the support plate 345. In a further embodiment, the support plate 345 comprises two support portions 403a, 403b and a connecting portion 405 to connect with the two support portions 403a, 403b. The connecting portion 405 has a narrower width (or a thinner thickness or shape) than that of the support portion 403a or 403b. Obviously, the support plate 345 is not limited to such a structure; any suitable structure can be used for the support plate 345 to attain a same effect.

Referring to FIGS. 5 and 7a, in an embodiment of the micro-actuator 32, the load plate 325 and the side arms 322, 323 are integrally formed; the support shaft 324 is bonded with the side arms 322, 323 by any traditional method, such as soldering, adhesive bonding, or laser bonding. In a preferred embodiment, the side arm 322 is parallel to the side arm 323, and the support shaft 324 is perpendicular to the two side arms 322, 323. In the preferred embodiment, the PZT elements 404a and 404b are bonded to the two side arms 322, 323 at their two ends by two pair of epoxy dots 59a, 59b. Understandably, the epoxy dots 59a, 59b can be replaced by adhesive or ACF (anisotropic conductive film) or other bonding means.

Referring to FIGS. 7a-7c, the PZT element 404b may be a d33 model PZT material and the PZT element 404a may be a d31 model PZT material 334 with a substrate 333, the d33 model PZT material being an extend model PZT material and the d31 model PZT material being a shrink model PZT material. When operated, therefore, the opposed operation of the PZT elements will cause the micro-actuator to have a good dynamic and static performance (big stroke and good resonance performance).

FIG. 7b shows a detailed structure of the d33 model material PZT element 404b. There are two electrodes 455 and 456 laminated alternately and separately to couple the bonding pads 320. The two electrodes cause the d33 material PZT element to have an expansion direction b which is same as the electrical field and poling direction a. When a voltage is input, the d33 material PZT element 404b will expand along the direction b, since the middle region is electrically connected to the suspension trace in the tongue and the two ends are fixed to the side arms 322, 323, thereby causing the PZT element 404b to expand and bend to one side.

FIG. 7c shows a detailed structure of the d31 material PZT element 404a. It comprises a substrate layer 333 (metal, ceramic, silicon or polymer) and a PZT material layer 334. There are two electrodes 455' and 456' laminated alternately and separately to couple the bonding pads 320' in the PZT material layer. The two electrodes cause the d31 material PZT element to have a contraction direction b' which is perpendicular to the electrical field and poling direction a'. When a voltage is input, the d31 material PZT element 404a will contract along the direction b', since the middle region is electrically coupled with the suspension trace in the tongue and the two ends are fixed to the side arms 322, 323, and the substrate layer is laminated on one side, thereby causing the element 404a to bend relative to the support shaft 324.

Figure 8C:
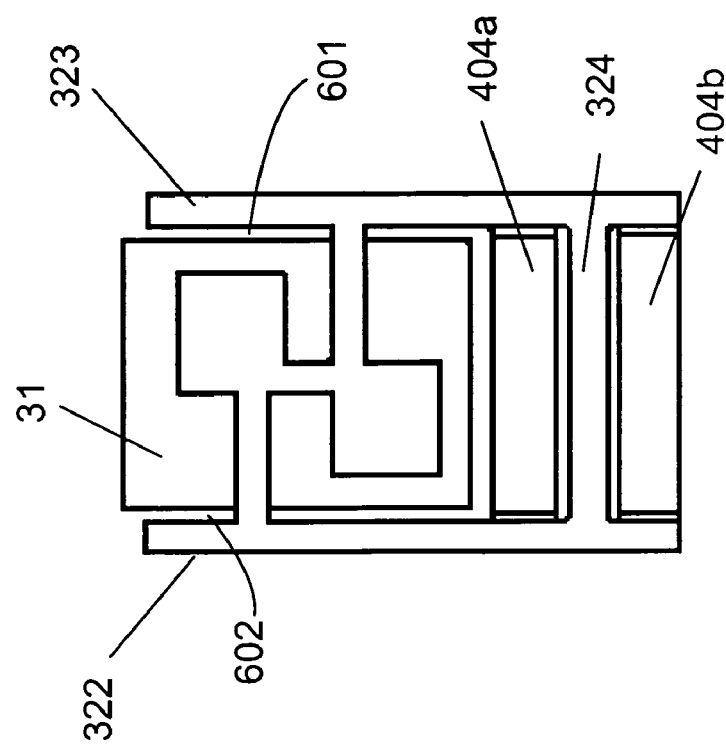
FIG. 8c is an enlarged plan view of the micro-actuator of FIG. 7a in the initial stage when no voltage is input to the micro-actuator.
Figure 8A:
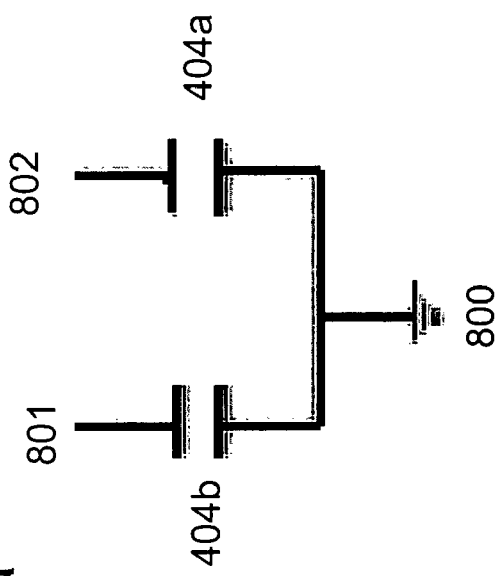
FIG. 8a is a schematic view of the electric coupling circuit between the first and second PZT elements shown in FIGS. 7b and 7c.

FIG. 8a shows the electrical coupling circuit between the two PZT elements 404a and 404b. The two PZT elements have a common ground end 800 and two input ends 801 and 802.

Figure 8B:
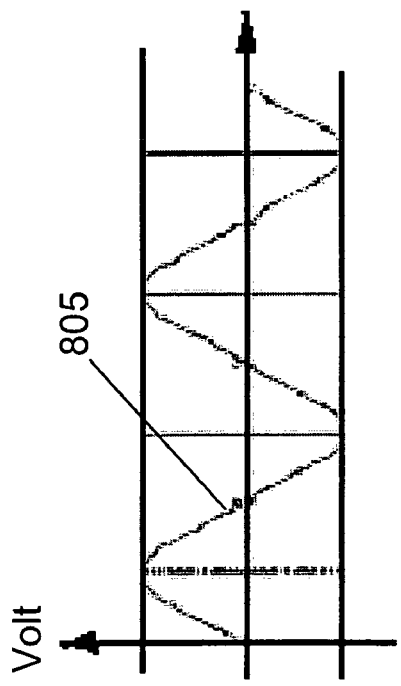

FIG. 8b shows an operation voltage wherein a sine waveform 805 is input for operating the micro-actuator.

FIG. 8c shows the micro-actuator in the initial stage, when no voltage is input and the slider 31 is in its original position.

Figure 8E:
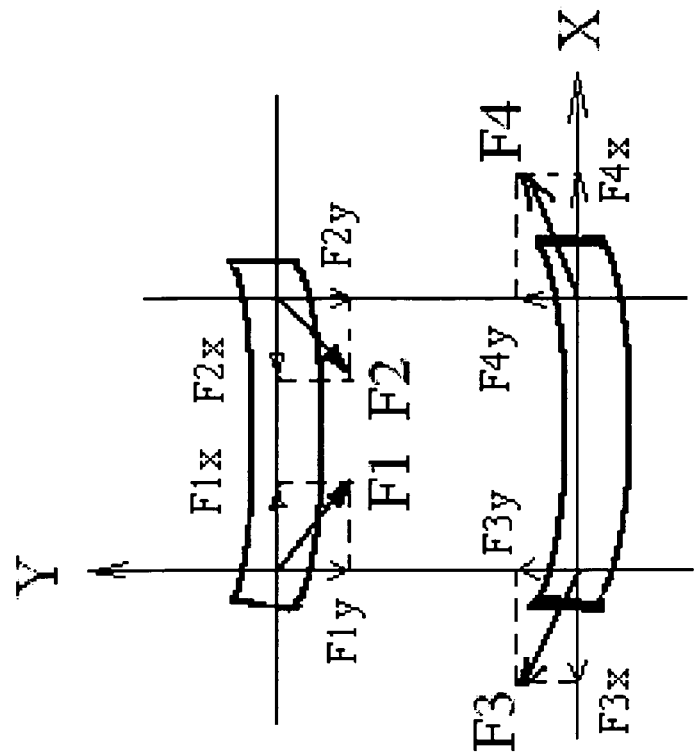
FIG. 8e is schematic view showing the forces applied to the PZT elements after a positive voltage is applied thereto.
Figure 8D:
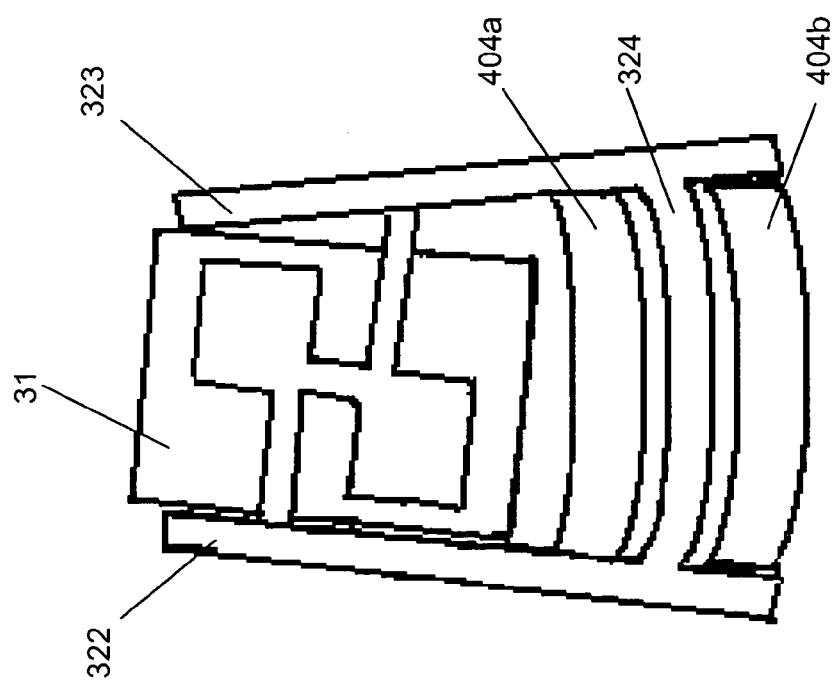
FIG. 8d is a view similar to FIG. 8c showing the micro-actuator of FIG. 7a after a positive voltage is applied to the first and second PZT elements.
Figure 8G:
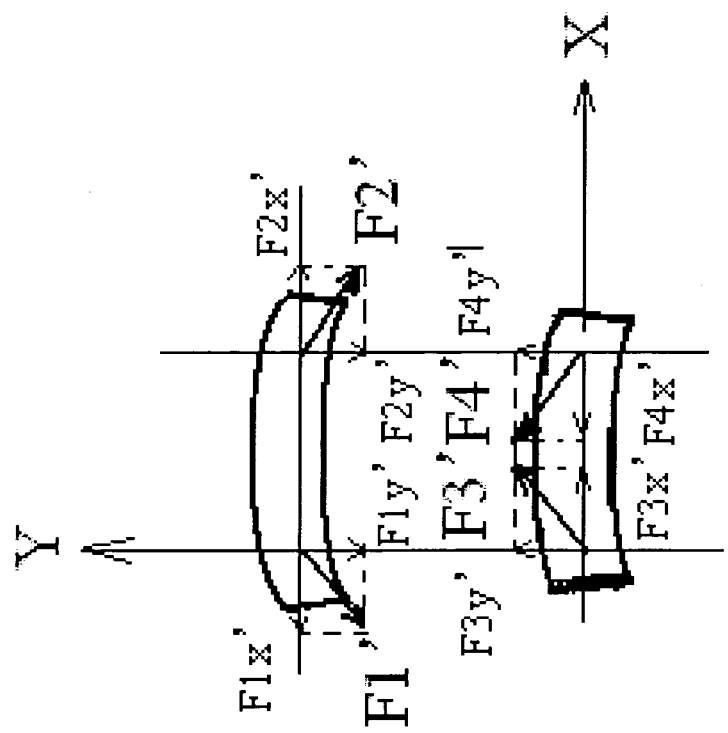
FIG. 8g is a schematic view showing the forces applied to the PZT elements after a negative voltage is applied thereto.

FIG. 8d shows the first half period, when a positive voltage is input to both PZT elements 404a, 404b. The d33 PZT element 404b will extend and deform toward the support shaft 324, owing to the middle region of the PZT element being fixed to the suspension tongue. The two ends of the PZT element 404b will push the side arms 322, 323 outwardly by two forces F3 and F4 (FIG. 8e). This will cause the support shaft 324 to deform and also cause the slider 31 to rotate in a clockwise direction in that it is mounted on the support portions 403a/403b (FIG. 7a).

Similarly, the d31 PZT element 404a will also respond to the input voltage which will cause it to contract and deform toward the shaft 324 since the middle region is fixed to the suspension and the substrate layer is laminated in the support shaft 324 side, thereby causing the slider 31 to rotate in the clockwise direction and enhance a big stroke together with the extension of the 404b element.

As show in FIG. 8e, the two ends of the PZT element 404a will pull the two side arms 322, 323 and generate two pull forces F1 and F2. Since the forces F1/F2/F3/F4 can be separated to F1x, F1y, F2x, F2y, F3x, F3y, F4x, F4y in both the X-axis and Y-axis, F1x will cancel the F2x since the energy is the same but the direction is opposed, F3x will cancel the F4x and F1y and F2y will cancel the F3y and F4y forces. Accordingly, when operating the two PZT elements 404a, 404b of the micro-actuator, it can achieve a big stroke but without any affected force (energy) to the suspension, which will provide a good static and dynamic performance, for example, a good resonance performance and stroke performance.

Figure 8F:
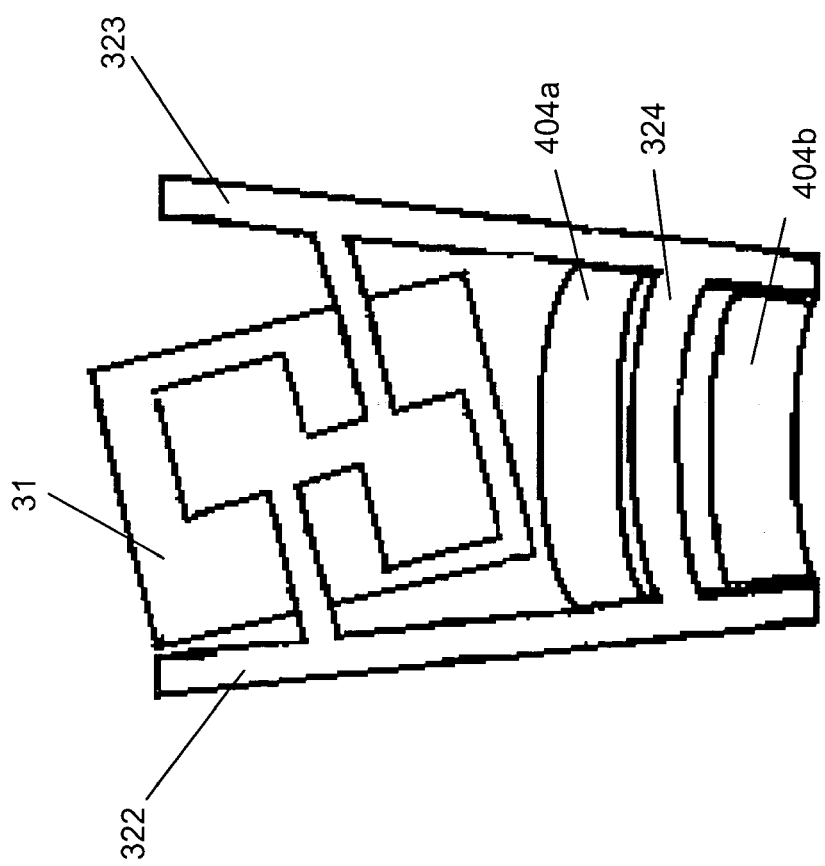
FIG. 8f is a view similar to FIG. 8c showing the micro-actuator of FIG. 7a after a second half period when a negative voltage is applied to the first and second PZT elements.

FIG. 8f shows the second half period when voltage goes to the negative side. The d33 PZT element 404b will shrink and deform outwardly support shaft 324, due to the middle region of the PZT element being fixed to the suspension tongue, and the two ends of the PZT element 404b will pull the side arms 322, 323 by pull forces F3' and F4'. This will cause the support shaft 324 to deform and also cause the slide 31 to rotate in a counter-clockwise direction in that it is mounted on both support portions 403a, 403b. Similarly, the d31 PZT element will respond to the input voltage and extend slightly and deform towards the shaft 324 since the middle region is fixed to the suspension and the substrate layer is laminated in the support shaft 324 side. This will also cause the slider 31 to rotate in the counter-clockwise direction and enhance a big stroke together with the 404b element. The two ends of the PZT element 404a will push the two side arms 322, 323 and generate two push forces F1' and F2'. Since the forces F1/F2/F3/F4 can be separated to F1$x'$, F1$y'$, F2$x'$, F2$y'$, F3$x'$, F3$y'$, F4$x'$, F4$y'$ in both the X-axis and Y-axis, F1$x'$ will cancel the F2$x'$ since the energy is the same but the direction is opposed, F3$x'$ will cancel the F4$x'$, F1$y'$ and F2$y'$ will cancel the F3$y'$ and F4$y'$ forces. Accordingly, when operating the two PZT elements, 404a, 404b of the micro-actuator, it can achieve a big stroke but without any affected force (energy) to the suspension, which will provide a static and dynamic performance, for example, a good resonance performance and stroke performance.

Figure 9A:
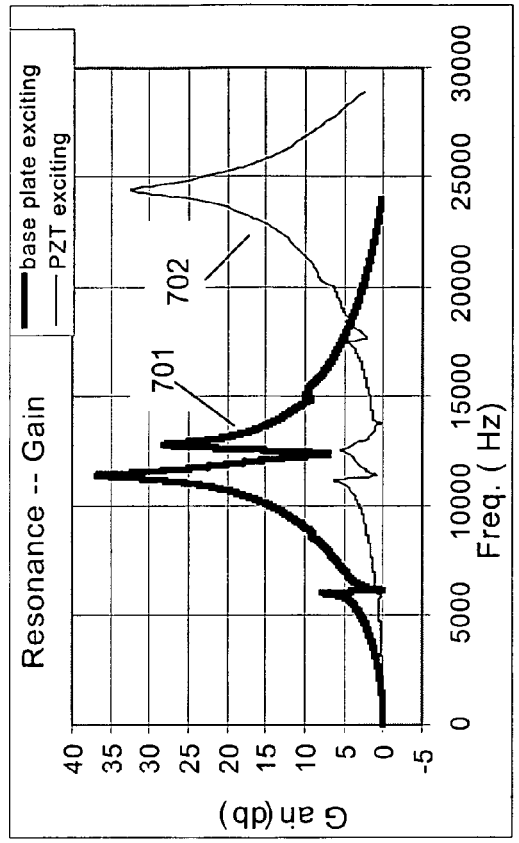
FIGS. 9a and 9b are resonance curves of the HGA of FIG. 3.
Figure 9B:
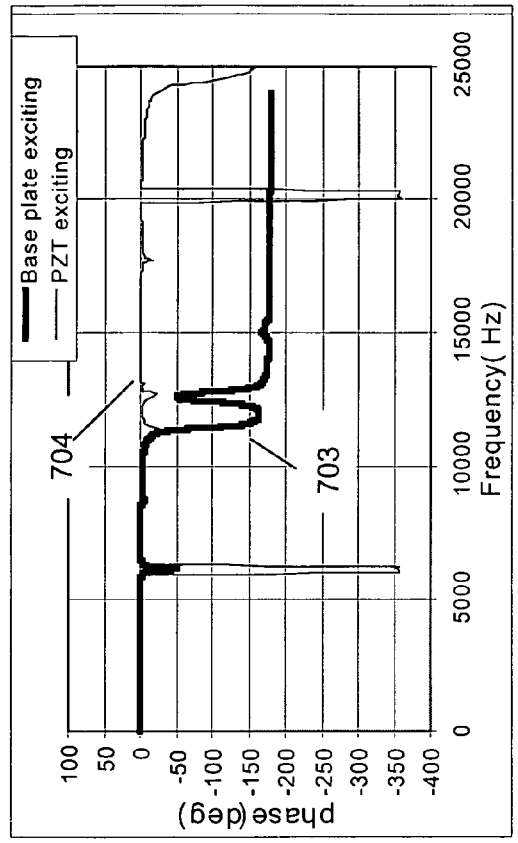

FIGS. 9a-9b show a testing result of the resonance performance of the HGA 3 of the invention. Here, numeral 702 shows a micro-actuator operation (PZT exciting) resonance gain curve, which has a phase 703, and numeral 701 shows a base plate exciting resonance gain curve, which has a phase 704. It shows that a suspension resonance has not happened in a low frequency (no torsion model and sway model), but only a pure micro-actuator resonance happened in a high frequency when exciting the PZT micro-actuator 32, thereby enlarging the servo bandwidth and improving the capacity of the HDD, as well as reducing the slider seeking and settling time.

FIG. 10a shows a modified embodiment of the invention wherein the PZT element 404a1 is a d33 model material and the other PZT element 404b1 is a d31 model material with a substrate layer 333a. When a voltage is input, the PZT element 404a1 may extend and push the two side arms 322, 323, due to the middle region of the PZT element being electrically coupled to the suspension tongue, so that it will deform to the slider side. For the other PZT element 404b1, since the substrate layer 333a is laminated on one side and its middle region is bonding with the suspension tongue, when a voltage is input, it will shrink and deform to the support shaft 324 side (FIG. 10b). This motion of the PZT elements will cause the slider to rotate, as hereinbefore described, and this motion will not generate any reaction force or vibration resonance to the suspension.

FIGS. 11a and 11b show further embodiments of the micro-actuator in accordance with this invention. There are two narrow or weak points 507 in the support shaft 324 to make it easy to deform when the PZT elements generate the motion. FIG. 11a shows a d31 PZT element 404a located at the inner side of the support shaft 324, and a d33 PZT element 404b located at the outer side of the support shaft 324. FIG. 11b shows another embodiment wherein the d31 PZT element 404b is located at the outer side of the support shaft 324 and the d33 PZT element 404a is located at the inner side of the support shaft 324. The embodiments of FIGS. 11a and 11b follow the same operating principals as the embodiments previously described herein.

During assembly, firstly, referring to FIG. 7a, in an embodiment of the present invention, the support shaft 324, the PZT elements 404a, 404b and a frame integrally formed by the two side arms 322, 323 and the load plate 325 are assembled together to form the micro-actuator 32. At the time, the two electrical bonding pads 320, 320' of the PZT elements are exposed outwardly. Then, referring to FIG. 5, the slider 31 is partially bonded to the load plate 325 of the micro-actuator 32 using two epoxy dots 52. The slider 31 has its center well matched with the center of the support plate 345. After that, referring to FIGS. 4a, 4b, 5 and 6, the support shaft 324 is partially bonded to the suspension tongue 328 with its middle portion by epoxy, adhesive or ACF so that the micro-actuator 32 with the slider 31 is assembled with the suspension 8. At the time, the slider 31 also has its center well matched with the dimple 329 of the load beam 17, so that it will keep the load force of the suspension 8 always being applied to the center of the slider 31 when the slider 31 flies on a disk (not shown). Also, the electrical bonding pads 204 of the slider 31 and the electrical bonding pads 320, 320' of the PZT elements 404a, 404b are respectively positioned corresponding to the electrical bonding pads 113, 330 of the suspension tongue 328. Then, a plurality of metal balls 905 (GBB, SBB or soldering paste) are used to electrically connect the electrical bonding pads 204 of the slider 31 with the electrical bonding pads 113 of the suspension tongue 328; simultaneously, a plurality of metal balls 219 (GBB, SBB or soldering paste) are used to electrically connect the electrical bonding pads 320, 320' of the PZT elements 404a, 404b with the electrical bonding pads 330 of the suspension tongue 328. Thus the micro-actuator 32 is electrically connected with the two electric multi-traces 311 of the suspension 8 while the slider 31 is electrically connected the two electric multi-traces 309 of the suspension 8. Through the electric multi-traces 309, 311, the slider 31 and the micro-actuator 32 are electrically connected with and controlled by the control system (not shown) through the connection pads 308.

In another embodiment, the support shaft 324 may be partially bonded to the suspension tongue 328 with its middle portion by laser welding. The laser welding process will make the bonding between the support shaft 324 and the suspension tongue 328 more firm, and also reduce any variation in the manufacturing process.

In the present invention, referring to FIG. 8c, the width of the slider 31 is preferably less than the distance between the two side arms 322 and 323. Thus two parallel gaps 601, 602 are formed between the slider 31 and the two side arms 322, 323 so as to assure a free movement of the slider 31 between the two side arms 322, 323. In addition, because the slider 31 has a partial bonding method with the two side beams 322, 323, it will move freely when being driven by the micro-actuator 32.

In the preferred embodiment of the present invention, one of the side arms 322, 323 is parallel to the other side arm. Understandably, one of the side arms 322, 323 may not be parallel to the other side arm, and the micro-actuator still can adjust the position of the slider. In addition, one of the connecting plates 401, 402 may be omitted and the position of the slider 31 still can be adjusted by the micro-actuator.

Compared with the prior art, the micro-actuator of the present invention needs only two simple PZT elements to adjust the position of the slider so that the manufacturing cost is low and the manufacturing process is simplified. In addition, the micro-actuator can rotate both the trailing side and leading side of the slider in different directions, while the micro-actuator of the prior art can only move the trailing side of the slider like a swing (because its leading side is fixed). Therefore, the present invention can provide a greater swing movement of the slider than the prior art because both the trailing and leading sides of the slider can move. Accordingly, a big head position adjustment capacity can be attained. Furthermore, because the micro-actuator is bonded to the suspension only by the support shaft so that two gaps are respectively formed between the suspension and the slider, and between the suspension and the PZT elements, the resonance performance is significantly improved when exciting the micro-actuator because no reaction force will be transferred to the suspension. In addition, because suspension resonance has been improved (reduce the resonance peak) in a low frequency when operating the micro-actuator, and only a micro-actuator resonance occurs in a high frequency, this would enlarge the servo bandwidth and then improve the capacity of the HDD.

Figure 12:
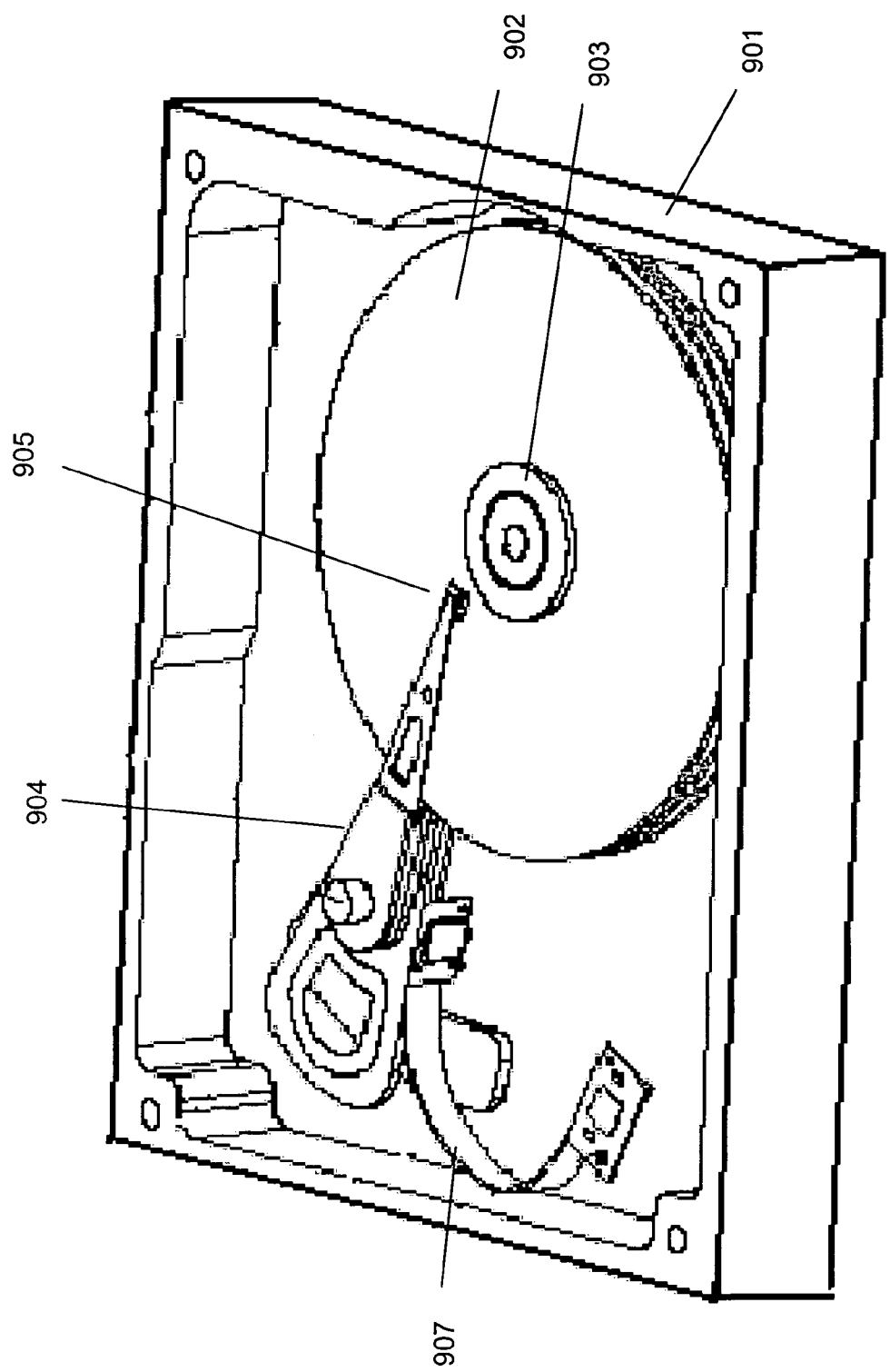
FIG. 12 is a perspective view of a disk drive unit according to an embodiment of the invention.

In the present invention, referring to FIG. 12, a disk drive unit of the present invention can be attained by assembling a housing 901, a disk 902, a disk drive spindle 903, a VCM (voice coil motor) 904 to control the head micro-actuator assembly 905, and a flex print circuit 907 for the VCM and the PCBA board, with the HGA 3 of the present invention. Because the structure and/or assembly process of the disk drive unit of the present invention are well known to persons ordinarily skilled in the art, a detailed description of such structure and assembly is omitted herefrom.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A head gimbal assembly comprising:
    a slider;
    a micro-actuator to adjust the position of the slider; and
    a suspension that supports the slider and the micro-actuator;
    wherein the micro-actuator comprises:
        two side arms;
        a load plate for supporting the slider, which is connected with the side arms and rotatable relative thereto in response to selective movement of the side arm or side arms;
        a pair of PZT elements both connected with the side arms;
        a support shaft coupled with the suspension, the support shaft being connected with the side arms and positioned between the PZT elements;
        the PZT elements being excitable by a predetermined voltage to move in opposite directions to effect selective movement of the side arms and rotation of the load plate and slider, and
    wherein the load plate comprises:
        a support plate connected with the slider; and
        two connecting plates connecting the support plate with the two side arms, respectively.
2. The head gimbal assembly of claim 1, wherein the two connecting plates are respectively connected in symmetrical positions about a center of the support plate's gravity.
3. The head gimbal assembly of claim 1, wherein the connecting plates are more flexible than the support plate.
4. The head gimbal assembly of claim 1, wherein the support shaft has at least one narrower portion to increase its flexibility.
5. The head gimbal assembly of claim 4 wherein the support shaft has two narrower portions near the ends thereof.
6. The head gimbal assembly of claim 1, wherein the support shaft is integrally formed with the side arms.
7. The head gimbal assembly of claim 1, wherein the two connecting plates are coupled with the load plate in mirror relation to a center of the load plate.
8. The head gimbal assembly of claim 1, wherein only the support shaft is coupled with the suspension.
9. The head gimbal assembly of claim 1, wherein one of the PZT elements is an extend model when subjected to the predetermined voltage, and the other PZT element is a shrink or contract model when subjected to the predetermined voltage.
10. The head gimbal assembly of claim 9, wherein the one PZT element is a d31 material PZT element, and the other PZT element is a d33 material PZT element.
11. The head gimbal assembly of claim 9, wherein each PZT element is a ceramic PZT, a thin-film PZT or a PMN-Pt crystal.
12. The head gimbal assembly of claim 11, wherein each PZT element is single-layer or multi-layer.
13. The head gimbal assembly of claim 1, wherein the PZT elements generate forces on the side arms that counteract each other to minimize forces on the suspension.
14. A micro-actuator comprising:
    two side arms;
    a load plate connected with the side arms and being rotatable relative thereto in response to selective movement of the side arm or side arms;
    a pair of PZT elements both connected with the side arms; and
    a support shaft connected with the side arms and positioned between the PZT elements;
    the PZT elements being excitable by a predetermined voltage to move in opposite directions to effect movement of the side arms and rotation of the load plate,
    wherein the load plate comprises:
        a support plate connected with a transducing element; and
        two connecting plates connecting the support plate with the two side arms, respectively.
15. The micro-actuator of claim 14, wherein a slider is mounted on the load plate.
16. The micro-actuator of claim 14, wherein the two connecting plates are respectively connected in symmetrical positions about a center of the support plate's gravity.
17. The micro-actuator of claim 14, wherein the connecting plates are more flexible than the support plate.
18. The micro-actuator of claim 14, wherein the support shaft has at least one narrower portion to increase its flexibility.
19. The micro-actuator of claim 18, wherein the support shaft has two narrower portions near the ends thereof.
20. The micro-actuator of claim 14, wherein one of the PZT elements is an extend model when subjected to the predetermined voltage, and the other PZT element is a shrink or contract model when subjected to the predetermined voltage.
21. The micro-actuator of claim 20, wherein the one PZT element is a d31 material PZT element, and the other PZT element is a d33 material PZT element.
22. The micro-actuator of claim 20, wherein each PZT element is a ceramic PZT, a thin-film PZT or a PMN-Pt crystal.
23. The micro-actuator of claim 22, wherein each PZT element is single-layer or multi-layer.
24. The micro-actuator of claim 23, wherein each PZT element further comprises a substrate layer connected with the single-layer or multi-layer.
25. The micro-actuator of claim 14, wherein, when the PZT elements are not subjected to a predetermined voltage, they are disposed in substantially parallel relation with the support shaft, and the ends of the PZT elements and the support shaft are disposed in substantially perpendicular relation to the side arms.

26. The micro-actuator of claim 14, wherein the support plate comprises two support portions and a connecting portion connecting the two support portions.

27. A disk drive unit comprising:
   a head gimbal assembly;
   a drive arm to connect with the head gimbal assembly;
   a disk; and
   spindle motor to spin the disk;
   wherein the head gimbal assembly comprises:
      a slider;
      a micro-actuator to adjust the position of the slider; and
      a suspension to support the slider and the micro-actuator;
   wherein the micro-actuator comprises:
      two side arms;
      a load plate for supporting the slider, the load plate being connected with the side arms and being rotatable relative thereto in response to selective movement of the side arm or side arms;
      a pair of PZT elements both connected with the side arms; and
      a support shaft coupled with the suspension, the support shaft being connected with the side arms and positioned between the PZT elements;
      the PZT elements being excitable by a predetermined voltage to move in opposite directions to effect selective movement of the side arms and rotation of the load plate and slider, and
   wherein the load plate comprises:
      a support plate connected with the slider; and
      two connecting plates connecting the support plate with the two side arms, respectively.

* * * * *